(12) United States Patent
Gibbons et al.

(10) Patent No.: US 7,185,792 B2
(45) Date of Patent: Mar. 6, 2007

(54) DISPENSING DEVICE WITH RACK AND PINION DRIVE FOR NOZZLE VALVE

(75) Inventors: Louis A. Gibbons, Stevensville, MD (US); David C. Campbell, Bel Air, MD (US)

(73) Assignee: Black & Decker Inc., Newfrey, DE (US)

( * ) Notice: Subject to any disclaimer, the term of this patent is extended or adjusted under 35 U.S.C. 154(b) by 210 days.

(21) Appl. No.: 10/926,275

(22) Filed: Aug. 25, 2004

(65) Prior Publication Data

US 2006/0043119 A1 Mar. 2, 2006

(51) Int. Cl.
*B67D 5/42* (2006.01)
*G01F 11/00* (2006.01)

(52) U.S. Cl. ............... 222/387; 222/389; 222/505; 222/397; 251/250

(58) Field of Classification Search ......... 222/386.5, 222/396, 399, 389, 327, 326, 505, 387, 507; 251/250
See application file for complete search history.

(56) References Cited

U.S. PATENT DOCUMENTS

| 227,193 | A | * | 5/1880 | White | 137/302 |
| 265,168 | A | * | 9/1882 | Solis | 251/250 |
| 2,236,786 | A | * | 4/1941 | Ayotte | 222/470 |
| 2,331,527 | A | * | 10/1943 | Welty et al. | 251/120 |
| 2,461,909 | A | * | 2/1949 | McClure | 251/120 |
| 2,818,999 | A | | 1/1958 | Miller | |
| 3,138,303 | A | | 6/1964 | Hoveland | |
| 3,308,998 | A | | 3/1967 | Oppasser et al. | |
| 3,568,892 | A | | 3/1971 | Burk | |

(Continued)

FOREIGN PATENT DOCUMENTS

DE 2036423 3/1971

(Continued)

OTHER PUBLICATIONS

Brandywine Associates, "Dispensing and Mixing Equipment for Adhesives and Chemicals", www.staticmixerdispenser.com/index, Feb. 10, 2003, 3 page printout.

(Continued)

*Primary Examiner*—Kevin Shaver
*Assistant Examiner*—Stephanie E. Tyler
(74) *Attorney, Agent, or Firm*—Harness, Dickey & Pierce, P.L.C.

(57) ABSTRACT

A pressurized gas cartridge drives a dispensing device for viscous product cartridges. The dispensing device and the viscous product cartridge form a gas enclosure separated from a product enclosure by a movable wall. A valve is driven by a rack and pinion valve drive mechanism between an open position and a closed position upon rotation of the pinion. The rack rotates the pinion upon linear movement thereof. A trigger is adapted to impart linear movement to the rack upon manual actuation of the trigger. The open position of the nozzle valve permits viscous product to flow through the dispensing passage, and the closed position of the nozzle valve prevents viscous product from flowing through the dispensing passage. The interface between the trigger and rack is designed to operationally disengage rather than transmit a force therebetween that is capable of damaging the device.

20 Claims, 3 Drawing Sheets

U.S. PATENT DOCUMENTS

| | | | |
|---|---|---|---|
| 3,587,930 A | 6/1971 | Schultz | |
| 3,640,431 A | 2/1972 | Plumer | |
| 3,703,249 A * | 11/1972 | Middleton | 222/507 |
| 3,703,250 A * | 11/1972 | Middleton | 222/507 |
| RE28,120 E | 8/1974 | Plumer | |
| 3,877,610 A | 4/1975 | Dickey | |
| 3,980,209 A | 9/1976 | Collar | |
| 3,983,947 A | 10/1976 | Wills et al. | |
| 3,987,939 A | 10/1976 | Pedone, Jr. et al. | |
| 4,215,802 A | 8/1980 | Ornsteen | |
| 4,284,213 A | 8/1981 | Lee | |
| 4,299,336 A | 11/1981 | Studer | |
| 4,340,154 A | 7/1982 | VanManen | |
| 4,376,498 A | 3/1983 | Davis, Jr. | |
| 4,382,530 A | 5/1983 | Calisto | |
| 4,386,717 A | 6/1983 | Koob | |
| 4,426,022 A | 1/1984 | Lang et al. | |
| 4,441,629 A | 4/1984 | Mackal | |
| 4,453,651 A | 6/1984 | Braithwaite et al. | |
| 4,461,454 A | 7/1984 | Vadnais | |
| 4,637,531 A | 1/1987 | Olsson | |
| 4,685,595 A | 8/1987 | Segatz | |
| 4,844,301 A | 7/1989 | Juillet | |
| D303,914 S | 10/1989 | Hinden et al. | |
| 4,925,061 A | 5/1990 | Jeromson, Jr. et al. | |
| 4,957,225 A | 9/1990 | Childers | |
| 4,986,444 A | 1/1991 | Corso | |
| 5,058,769 A | 10/1991 | Kurtz | |
| D321,309 S | 11/1991 | Myers | |
| 5,090,596 A * | 2/1992 | Knight | 222/91 |
| 5,104,013 A | 4/1992 | Hawley | |
| 5,181,636 A | 1/1993 | Anderson et al. | |
| 5,203,507 A | 4/1993 | Matthews | |
| D342,654 S | 12/1993 | Jens | |
| D343,103 S | 1/1994 | Bunce | |
| 5,297,697 A | 3/1994 | Boring | |
| 5,339,987 A * | 8/1994 | D'Andrade | 222/79 |
| 5,361,941 A | 11/1994 | Parekh et al. | |
| D357,392 S | 4/1995 | Kimpel et al. | |
| 5,492,249 A | 2/1996 | Beach | |
| 5,535,925 A | 7/1996 | Hinden et al. | |
| 5,556,009 A | 9/1996 | Motzko | |
| 5,573,148 A | 11/1996 | Poole et al. | |
| 5,595,327 A | 1/1997 | Dentler et al. | |
| 5,667,138 A * | 9/1997 | Crampton | 239/225.1 |
| 5,833,099 A | 11/1998 | Boaz et al. | |
| 5,839,621 A * | 11/1998 | Tada | 222/383.1 |
| 5,887,765 A | 3/1999 | Broesamle | |
| 6,022,504 A | 2/2000 | Boaz et al. | |
| 6,032,830 A | 3/2000 | Brown | |
| 6,039,223 A | 3/2000 | Damask | |
| 6,062,428 A | 5/2000 | Callahan | |
| 6,488,180 B1 | 12/2002 | Bayat | |
| 6,540,113 B2 * | 4/2003 | Gardos | 222/137 |
| 6,672,489 B1 | 1/2004 | Huang | |
| 2002/0108971 A1 | 8/2002 | Lafond | |
| 2002/0145014 A1 | 10/2002 | Harris | |
| 2004/0074927 A1 | 4/2004 | Lafond | |

FOREIGN PATENT DOCUMENTS

| | | |
|---|---|---|
| DE | 2944969 | 5/1980 |
| DE | 3409724 | 9/1985 |
| DE | 3526141 | 2/1986 |
| DE | 3526142 | 2/1986 |
| DE | 3920694 | 1/1991 |
| DE | 9419733.4 | 6/1995 |
| EP | 0290259 | 11/1988 |
| GB | 2162902 | 2/1986 |
| GB | 2162903 | 2/1986 |
| JP | 56-089865 | 7/1981 |
| JP | 62-011571 | 1/1987 |
| JP | 64-038164 | 2/1989 |
| JP | 02-144168 | 6/1990 |
| JP | 06-000428 | 1/1994 |
| JP | 06-099122 | 4/1994 |
| JP | 09-024981 | 1/1997 |
| JP | 2001-315864 | 11/2001 |

OTHER PUBLICATIONS

C.R. Laurence Co. Inc. (CRL), "CRL Introduces New Sealant and Caulking Gun Duo", USGlass, Metal & Glazing, Mar. 2001, p. 65.
Essex ARG, "EssexPak System Saves Time and Money", Glass Digest, May 15, 2001, p. 57.
TAH Industries, "Cartridge Systems", www.tah.com/display, Feb. 10, 2003, 1 page printout.

* cited by examiner

DISPENSING DEVICE WITH RACK AND PINION DRIVE FOR NOZZLE VALVE

FIELD OF THE INVENTION

The present invention relates to dispensing devices for viscous product cartridges; and more particularly, to such dispensing devices having a nozzle valve.

BACKGROUND OF THE INVENTION

Some viscous products, including for example, adhesives, caulks, and sealants, are commonly packaged in product cartridges or tubes. These tubes typically include a cardboard or plastic cylindrical body. Generally, a dispensing nozzle is located at one end of the tube and at the other end of the tube is a piston that operates as a moveable wall. These product cartridges are typically inserted into a dispensing device that includes some mechanism for exerting a force on the movable wall to push product from the product cartridge.

The force exerting mechanism has traditionally been a trigger that mechanically cooperates with a shaft to drive the shaft against the movable wall. Pneumatic pressure has also been suggested as an alternative force exerting mechanism. At the end of a dispensing operation, the product within the cartridge can remain pressurized which causes product to continue to be dispensed beyond that desired by the user. Consequently, nozzle valves have been provided in such pneumatic dispensing devices to provide the user more controlled termination of product dispensing.

The nozzle valve has generally been linked to a manually operated trigger that also controls the flow of the pneumatic fluid. The driving linkage between the trigger and the nozzle valve, however, has typically not been very robust. For example, product in the nozzle can begin to harden between uses such that the drive linkage is incapable of developing sufficient driving force to actuate the nozzle valve. In addition, in some instances attempts to actuate the trigger can actually cause damage to the drive linkage, making the dispensing device inoperable. Accordingly, a robust drive linkage for the nozzle valve is desirable.

SUMMARY OF THE INVENTION

In accordance with one aspect of the present invention, a valve drive mechanism for a dispensing device that is adapted to dispense viscous product from a product cartridge having a valve associated with a dispensing passage is provided. The valve drive mechanism includes a pinion associated with the valve and adapted to move the valve between an open position and a closed position upon rotation of the pinion. A rack is associated with the pinion and adapted to rotate the pinion upon linear movement of the rack. A trigger is adapted to impart linear movement to the rack upon manual actuation of the trigger. The open position of the nozzle valve permits viscous product to flow through the dispensing passage, and the closed position of the nozzle valve prevents viscous product from flowing through the dispensing passage.

In accordance with another aspect of the present invention, a device for dispensing a viscous product from a viscous product cartridge is provided. The dispensing device is adapted to be driven by a pressurized gas source. The dispensing device includes a housing adapted to retain the viscous product cartridge and to cooperate with the viscous product cartridge to form a gas enclosure separated from a product enclosure by a movable wall. A fluid passage extends from an inlet associated with the pressurized gas source to the gas enclosure to enable pressurized gas to generate a dispensing force on the movable wall. A nozzle is adapted to seal to the product cartridge and to provide a dispensing passage for the product cartridge. The nozzle has a valve body located along the dispensing passage and movable between an open position and a closed position. A pinion is associated with the valve body and adapted to move the valve body between an open position and a closed position upon rotation of the pinion. A rack is associated with the pinion and adapted to rotate the pinion upon linear movement of the rack. A trigger is adapted to impart linear movement to the rack upon manual actuation of the trigger. The open position of the valve body permits viscous product to flow through the dispensing passage, and the closed position of the valve body prevents viscous product from flowing through the dispensing passage.

In accordance with yet another aspect of the present invention, a dispensing device for a viscous product includes a movable wall separating a product enclosure having a dispensing orifice from a gas enclosure. A fluid passage provides fluid communication between a pressurized gas cartridge and the gas enclosure. A nozzle is sealed to the product cartridge and provides a dispensing passage for the product cartridge. The nozzle has a valve body located along the dispensing passage and is movable between an open position and a closed position. A pinion is associated with the valve body and has a plurality of gear teeth. A rack has a plurality of cooperating gear teeth drivingly engaged with the plurality of gear teeth of the pinion and has a notch. A trigger has a drive lug drivingly engaged with the notch of the rack upon manual actuation of the trigger. Manual actuation of the trigger causes the drive lug to linearly drive the rack which causes the cooperating gear teeth of the rack and the plurality of gear teeth of the pinion to rotate the pinion and move the valve body from a closed position which prevents viscous product from flowing through the dispensing passage to an open position which permits viscous product to flow through the dispensing passage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, although the drive linkage is described herein in connection with a pneumatic dispensing device for viscous product cartridges, such a drive linkage may be used with alternative dispensing devices for viscous product cartridge.

As used herein, "pressurized gas cartridge" means a container that is capable of housing a material that can be dispensed from the container in the form of a pressurized gas. Thus, it is possible that the material inside the container may be, at least partially, in a form that is not gaseous. Similarly, the phrase "product cartridge" as used herein, means a container capable of housing a product for shipping and/or storage and for dispensing. Thus, the term "cartridge" does not, in itself, require any specific structural configuration. In addition, the phrase "associated with" as used herein means direct or indirect physical and/or operable connection. Thus, the phrase "associated with" does not, in itself, require direct contact.

Figure 1:
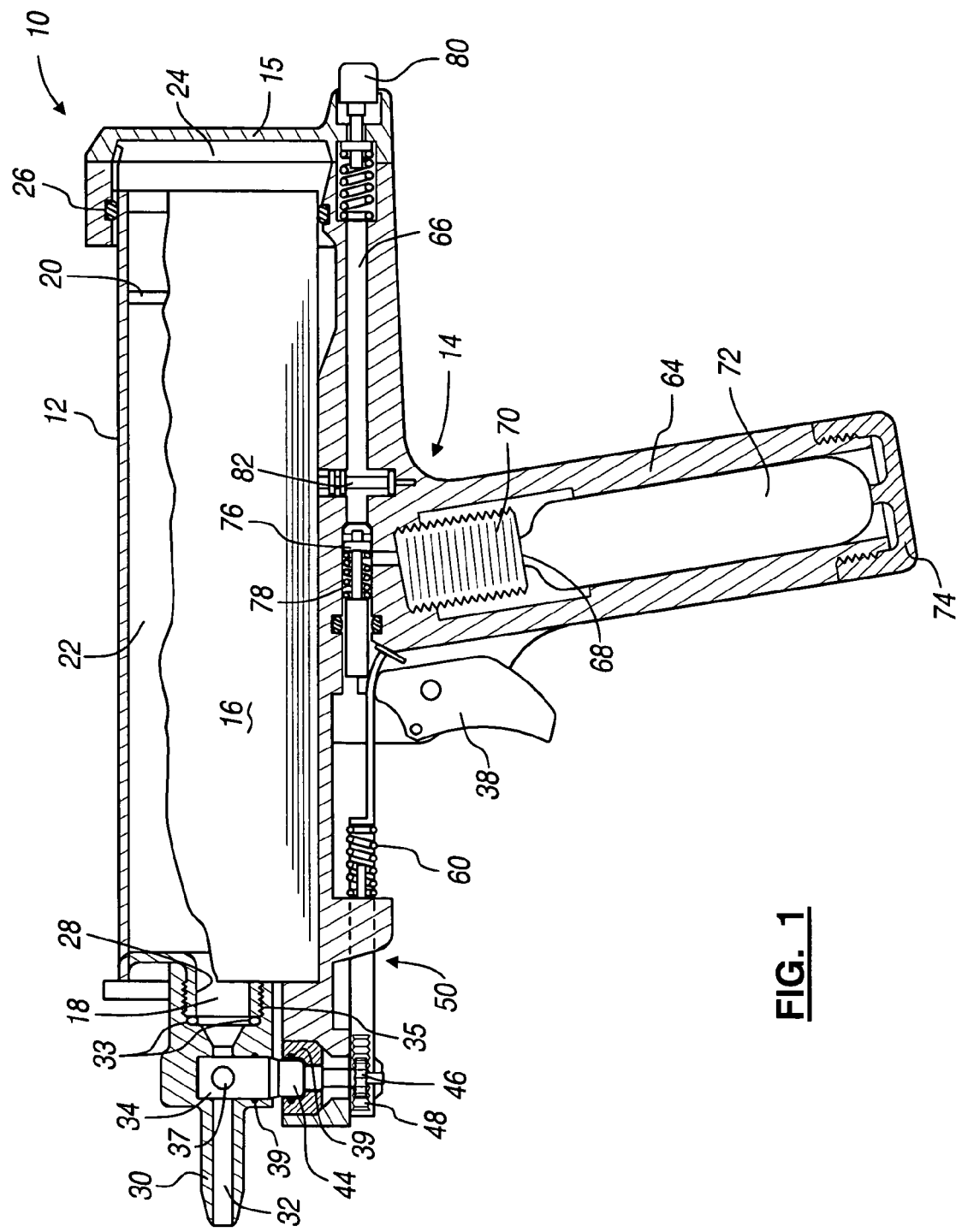
FIG. 1 is a cross-sectional illustration of a dispensing device in accordance with one embodiment of the present invention.
Figure 2:
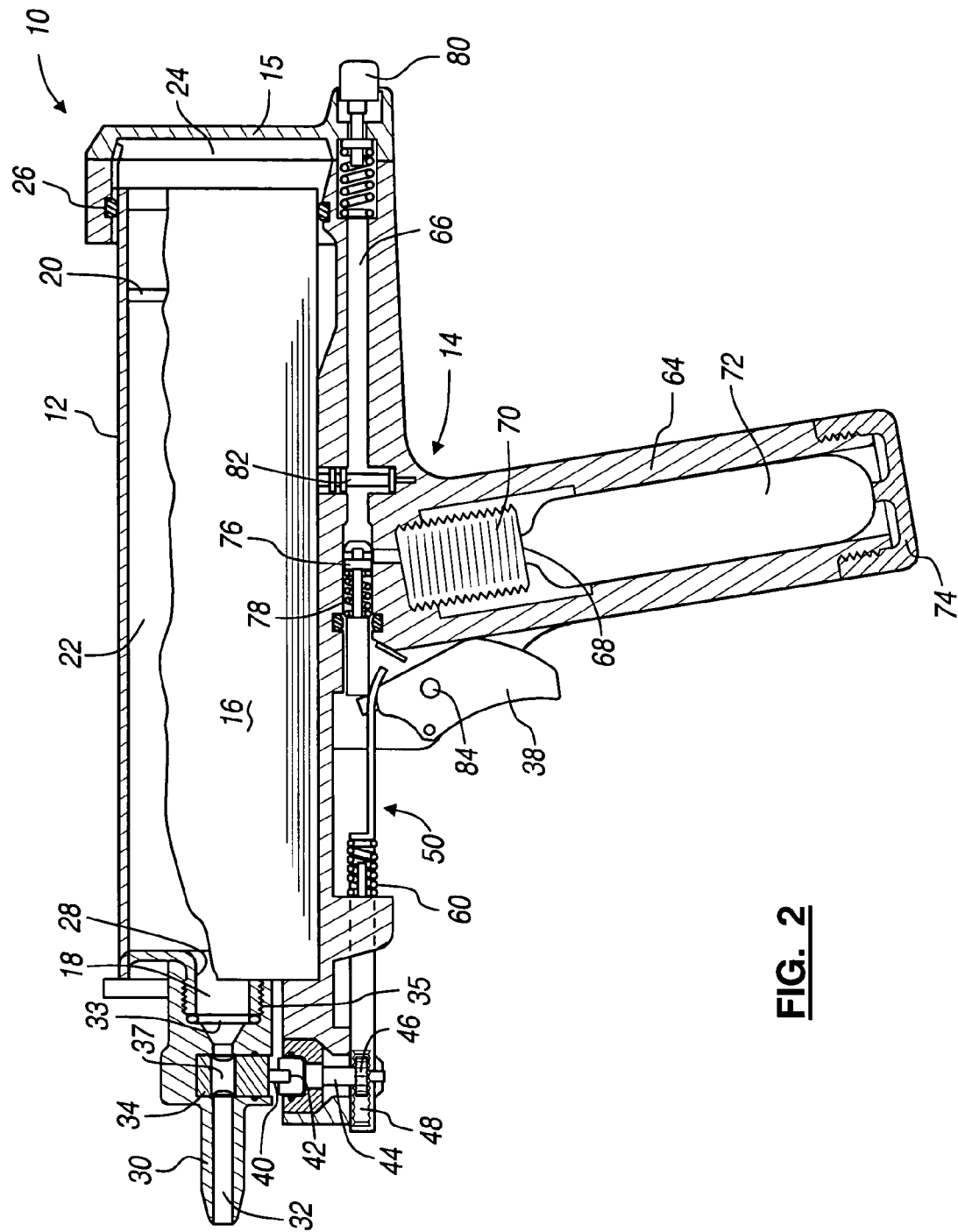
FIG. 2 is a cross-sectional illustration of the dispensing device similar to FIG. 1, but with the nozzle valve in an open position.

Referring to FIGS. 1 and 2, one preferred embodiment of a dispensing device 10 for dispensing a viscous product from a viscous product cartridge 12 is illustrated. The dispensing device 10 includes a housing 14. The housing 14 includes an upper portion 15 that operates as a product cartridge housing component. This product cartridge housing component 15 is adapted to retain the viscous product cartridge 12. In the illustrated embodiment, the viscous product cartridge 12 is a cylindrical tubular member having a relatively rigid cylindrical wall 16. For example, the cylindrical wall 16 may be formed of cardboard or plastic. Such tubular cartridges 12 are commonly used in conjunction with or in association with construction adhesives, sealants and caulk.

At one end of the cylindrical tubular product cartridge 12 is a dispensing orifice 18. The dispensing orifice 18 may be provided, for example, by cutting the end of a nozzle (not seen) that is typically provided on many such commercially available viscous product cartridges 12. In addition, it may be necessary to rupture an internal seal (not shown) at the base of the nozzle that seals the dispensing orifice 18 and is often also included in such commercially available product cartridges 12. At the opposite end of the product cartridge 12 is a piston 20 that seals the end of the tube 12. The piston 20 operates as a movable wall that is capable of forcing product from the product enclosure 22 through the dispensing orifice 18 as the piston 20 moves toward the dispensing orifice 18.

Although this embodiment uses product cartridges having a relatively rigid cylindrical wall 16 and a movable piston 20, an alternative product cartridge (not shown) is made of flexible thin-film packaging material. The corresponding product cartridge housing component 15 of this alternative embodiment can optionally use a separate movable piston to dispense the product, similar to the previously described movable piston 20. In yet another alternative embodiment, the gas enclosure can surround the flexible side walls of a squeeze tube. Commonly used squeeze tube type cartridges have a substantially cylindrical shape flexible side wall that tapers to a flat seal on one end with a dispensing orifice on an opposite end. Thus, the flexible side walls can move toward each other under external pressure within the gas enclosure to force product through the dispensing orifice. Accordingly, the separate movable piston and/or the flexible side walls provide the movable wall(s) in these alternative embodiments.

Returning to the illustrated embodiment, the upper portion of the housing 14 operates as a product cartridge housing component 15. The product cartridge housing component 15 is adapted to cooperate with the viscous product cartridge 12 to form a gas enclosure 24 separated from the product enclosure 22 by the piston wall 20. In this embodiment, the product cartridge housing component 15 is sealed to the cylindrical outer wall 16 of the product cartridge 12 using an O-ring 26 to form a gas enclosure 24 between the housing component 15 and the product cartridge 12. The piston 20 or movable wall separates the gas enclosure 24 from the product enclosure 22 formed inside the product cartridge 12.

A nozzle housing 30 is adapted to seal with a wall 28 of the product cartridge 12 that surrounds the dispensing orifice 18. As indicated above, this wall 28 can be provided by trimming the end of a nozzle from a standard caulk or adhesive product cartridge 12. A rubberized gasket 33 may be provided between the nozzle housing component 30 and the wall 28 of the product cartridge 12 to facilitate this seal. Threads 35 are provided on the nozzle housing 30 to enable threaded engagement between the wall 28 of the product cartridge 12 and the nozzle housing 30. The threads 35 of the nozzle housing 30 can be self-threading (i.e., adapted to form cooperating threads on a smooth part of the wall 28) or the wall 28 can already have cooperating threads 35 formed thereon.

The nozzle housing 30 includes a dispensing passage 32 which is selectively opened and closed by a valve body 34. The valve body 34 includes a passage 37 therethrough for selective alignment with the dispensing passage 32 of the nozzle housing 30. An annular ridge 39 on the valve body 34 cooperates with an annular groove in the nozzle housing 30 to retain the valve body 34 in the nozzle housing 30. The lower end of the valve body 34 includes a rectangular shaped nozzle drive lug 40. The nozzle drive lug 40 fits into a drive notch 42 of a pinion 44. The teeth 46 of the pinion 44 cooperate with the teeth 48 of a rack 50. In an alternative embodiment, the rack 50 can be associated with the pinion 44, for example, through an intermediate idler gear (not seen).

Figure 3:
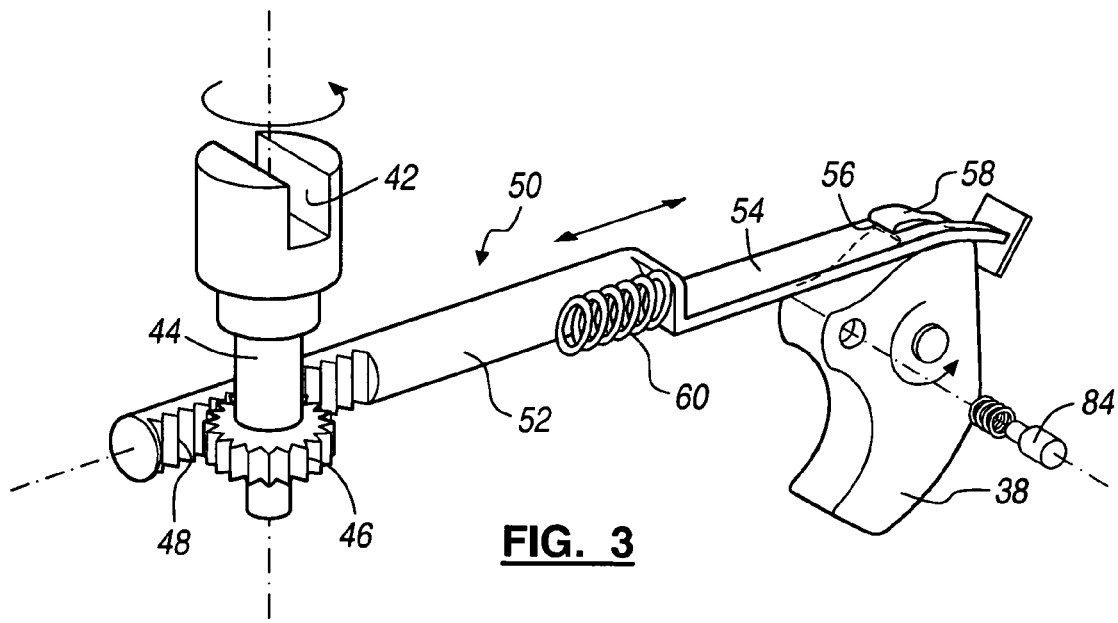
FIG. 3 is an enlarged perspective illustration of the drive linkage of the device of FIG. 1.

Referring to FIG. 3, the rack includes a generally cylindrical rod 52 and a flat rod 54. The flat rod 54 of the rack 50 includes a notch 56 seen in FIG. 4. A lug 58 on the trigger 38 contacts against the flat rod 54 of the rack 50 at the end of the notch 56 so that the trigger 38 can drive the rack 50 forward to cooperate with the pinion 44 and rotate the valve body 34 into an open position (seen in FIG. 2). Upon releasing the trigger 38, a spring 60 biases the rack 50 to move the trigger 38 and rotate the valve body 34 into a closed position (seen in FIG. 1).

In an alternative embodiment (not seen), the nozzle, including the valve body and dispensing passage, may be integrally provided as part of the product cartridge, rather than as a separate part. This configuration eliminates the need to seal the dispensing orifice 18 of the product cartridge 12 to a separate nozzle housing. In contrast, the preferred embodiment described above enables re-use of the nozzle housing 38 and valve 44 assembly with multiple disposable product cartridges 12. In addition, the embodiment described above enables the use of differently sized and/or configured nozzle housings by permitting nozzle housings to be exchanged on a product cartridge.

The rack 50 and pinion 44 is capable of providing a significant amount of force to rotate the valve body 34. Thus, this rack 50 and pinion 44 valve drive mechanism can open the valve 34, even when product may have partially solidified in the dispensing passage 32 between uses. In order to avoid damaging the rack 50 and pinion 44 valve drive mechanism, however, an override disengagement feature is provided that operationally disengages the rack 50 and pinion 44 valve drive mechanism from the trigger 38 prior to damaging the valve 34, the trigger 38 and/or the rack 50 and pinion 44 drive mechanism.

Figure 4A:
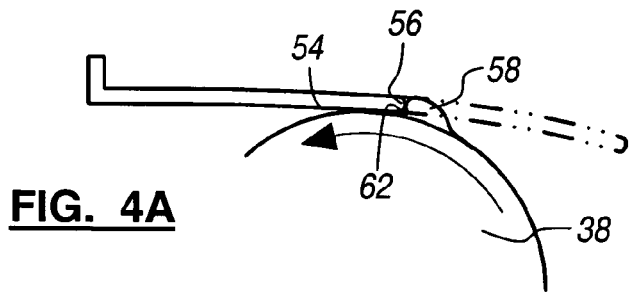
FIGS. 4a, 4b and 4c are successive fragmentary elevational illustrations of the trigger disengaging from the rack.
Figure 4B:
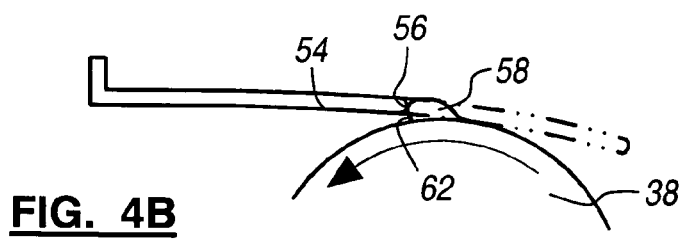
Figure 4C:
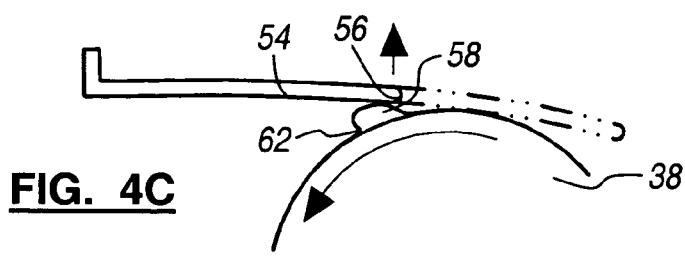

Referring to FIG. 4a, the end of the notch 56 of the flat rod 54 of the rack 50 has a rounded profile that partially mates with a small undercut 62 in the drive lug 58 of the trigger 38. Thus, during normal operation, the end of the notch 56 of the rack 50 is retained against the drive lug 58 of the trigger 38. Referring to FIG. 4b, if too much force is generated between the rack 50 and the trigger 38, the rounded end of the notch 56 of the rack 50 disengages from undercut 62 and the drive lug 58 of the trigger 38 begins to pass under the rack 50. Referring to FIG. 4c, this permits the trigger 38 to rotate forward without damaging the dispensing device 10. Upon returning the trigger 38 to its original position, the drive lug 58 will reengage with the notch 56 of the pinion 44.

As indicated above, a lower portion 64 of the housing 14 of the dispensing device 10 operates as a handle for manually grasping the dispensing device 10. The manually actuated trigger 38 mentioned above is associated with the handle 64. In addition, the handle provides a gas cartridge housing component 64. A fluid passage 66 provides fluid communication between the gas enclosure 24 and an inlet 68 associated with a pressure regulator 70 located in the handle portion 64 of the housing 14. The gas cartridge housing component 64 is adapted to retain a gas cartridge 72 in sealed fluid communication with the inlet 68.

Specifically, the inlet 68 of the fluid passage 66 includes a resilient gasket seal member (not seen). In addition, the inlet 68 can include a piercing member (not seen) to pierce an opening in the gas cartridge 72 upon sealing to the inlet 68. The gas cartridge housing component 64 includes a screw on cap 74 associated with the gas cartridge 72. As the cap 74 is screwed onto the remainder of the gas cartridge housing component 64, the cap 74 pushes the gas cartridge 72 into sealing engagement with the gasket of the inlet 68. In addition, screwing the cap 74 onto the remainder of the gas cartridge housing component 64 causes any piercing member to pierce the gas cartridge 72. In any event, sealed fluid communication is provided between the interior of the gas cartridge 72 and the fluid passage 66.

The pressure regulator 70 reduces the pressure of the $CO_2$ gas flowing from the pressurized $CO_2$ cartridge 72 to a lower pressure level. This lower level of pressure is high enough to dispense product from the product cartridge 12 at a desirable rate. Thus, the pressure regulator 70 receives gas from the inlet 68 at a relatively high pressure from the $CO_2$ cartridge 72 and, after converting the gas to a reduced pressure, discharges the $CO_2$ gas from an outlet side of the pressure regulator 70 into the fluid passage 66 toward the gas enclosure 24.

A gas flow control valve 76 is also located along the fluid passage 66. The gas flow control valve 76 is biased to a closed position by a spring 78. The gas flow control valve 76 is manually actuated by the trigger 38 which moves the valve 76 to an open position as seen in FIG. 4. In the open position, gas is permitted to travel along the passage 66 from the pressurized $CO_2$ cartridge 72 and to the gas enclosure 24. The resulting increase in gas within the gas enclosure 24 causes the pressure to increase until the piston 20 begins to move.

As indicated above, the trigger 38 is also operatively connected to the nozzle valve body 34 to open the valve upon manual actuation. Thus, in this embodiment, the valve 34 of the dispensing passage 32 and the gas flow control valve 76 are simultaneously opened. As the piston 20 begins to move, a volume of the gas enclosure 24 expands reducing a volume of the product enclosure 22 and dispensing product through the dispensing orifice 18 and the dispensing passage 32. Upon release of the trigger 38, both the nozzle valve 34 and the gas flow control valve 76 move to their closed positions as seen in FIGS. 1 and 3. Thus, the product within the product enclosure 22 is maintained under pressure due to the remaining gas pressure within the gas enclosure 24. Product does not continue to be dispensed, however, due to the valve 34 of the dispensing passage 32 being in a closed position.

Two additional valve mechanisms are located within the fluid passage in this embodiment. One is a pressure release valve 80 that is additionally associated with the gas enclosure 24 and is biased to a closed position. The pressure release valve 80 may be manually moved to an open position to permit the release of pressure from the gas enclosure 24. This release of pressure can, for example, facilitate the replacement of the viscous product cartridge 12. A maximum pressure release valve 82 is also included in the fluid passage 66 that is designed to vent the $CO_2$ gas from the gas enclosure 24 should the pressure therein exceed a maximum pressure level.

Operation of the dispensing device 10 described above involves locating a product cartridge 12 in the product cartridge housing component 15. As described above, this creates a gas enclosure 24 separated from a product enclosure 22 by a moveable wall 20. In addition, operation of the illustrated dispensing device 10 involves locating a $CO_2$ cartridge 72 inside the gas cartridge retaining housing component 64. The $CO_2$ cartridge 72 is sealed to the inlet 68 by threading the cap 74 onto the housing 14 as discussed above. Thus, the interior of the $CO_2$ cartridge 72 is located in sealed fluid communication with an inlet 68 of the passage 66 by screwing on the cap 74.

Referring to FIG. 2, application of the product dispensing force is accomplished by manually actuating the trigger 38 which causes opening of both the nozzle valve 34 and gas flow control valve 76. Pressurized gas from the $CO_2$ cartridge 72 flows through the fluid passage 66 and passes through the pressure regulator 70 where the pressure level of the gas is reduced to an operational pressure level. This pressure level is selected to affect a desirable dispensing rate without unnecessarily increasing the pressure. An adjustment mechanism (not shown) for the pressure regulator 70 can additionally be provided to enable a user to adjust the operating pressure level for different products. Typically, the desired operating pressure is between about 15 and about 75 psi to accommodate different types of sealant, caulk, and viscous products. In certain cases, it is preferred that the desired operating pressure is between about 25 and about 50 psi.

The pressurized gas flows past the open gas flow control valve 76 in the fluid passage 66 and into the gas enclosure 24. As the quantity of gas in the gas enclosure 24 increases, the gas begins to push against the piston 20. Since the nozzle valve 34 is open the piston 20 begins to move, thereby increasing the volume of the gas enclosure 24. Conversely, this movement of the piston 20 decreases the volume of the product enclosure 22. Thus, product is pushed from the product enclosure 22 through the dispensing orifice 18, and the open nozzle valve 34 in the dispensing passage 32. Upon release of the trigger 38, the gas flow control valve 76 closes to cause the flow of gas from the $CO_2$ cartridge 72 to the gas enclosure 24 to cease as seen in FIG. 1. In addition, the product valve 34 in the nozzle 30 closes which causes the flow of product through the dispensing passage 32 to cease.

During product dispensing, the pressure of the gas within the gas enclosure 24 generates a dispensing force that is exerted on the movable piston 20 which is sufficient to move the movable piston 20 to dispense product from a dispensing orifice 18 of the product cartridge 12.

The size and configuration of the nozzle 30 also has an effect on the dispensing operation. A nozzle 30 may be selected from several alternative nozzles. The nozzles 30 can have variously sized dispensing passages 32 and/or angled or otherwise shaped tips. In order to replace a nozzle 30 that has been attached to a product cartridge 12 and used to dispense product, it is important to insure that there is not any residual pneumatic pressure in the gas enclosure 24. Any residual pressure can be released by manually actuating the pressure release valve 80 prior to removing the nozzle 30.

The nozzle 30 and nozzle drive mechanism cooperate to insure that any residual pressure in the gas enclosure 24 has been released prior to permitting removal of the nozzle 30. Specifically, the rectangular nozzle lug 40 is adapted to be in a plane that is substantially parallel to a plane passing through the threads 35 when the valve body 34 is in the open position. This corresponds to the rectangular nozzle lug 40 being oriented substantially perpendicular to the dispensing passage 18, when the valve body 34 is in the open position.

It should be understood that the rectangular nozzle lug 40 must be in this substantially parallel plane orientation in order for the nozzle 30 to be unscrewed from a product cartridge 12 located within the dispensing device 10. If the rectangular nozzle lug 40 is oriented with the valve body 34 in the closed position, for example, pinion 44 will interfere with the rectangular nozzle lug 40 and prevent the nozzle housing 30 from being unscrewed. Accordingly, the nozzle valve 34 must be in the open position in order to permit removal of the nozzle housing 30.

Requiring that the nozzle valve 34 be in the open position for removal of the nozzle housing 30 serves as a reminder to vent any residual gas pressure in the gas enclosure 24. Any meaningful residual gas pressure will cause product to be dispensed upon moving the nozzle valve 34 into the open position prior to removing the nozzle housing 30. Thus, the user will be reminded to vent this residual pressure using pressure release valve 80 prior to attempting to remove and replace a nozzle housing 30.

Referring to FIG. 3, a trigger lock 84 is associated with the trigger 38 to conveniently maintain the trigger 38 (and therefore, the valve body 34) in the open position. This trigger lock 84 can also be used to lock the valve 34 in the open position during long dispensing operations. Thus, the trigger lock 84 can also be useful to help minimize hand fatigue during extended periods of use of the dispensing device 10. In addition, the trigger lock 84 facilitates removal and replacement of the nozzle housing 30, since the nozzle valve 34 must be in the open position in order to change the nozzle housing 30 as discussed above.

The trigger lock 84 includes a spring 85 that biases the trigger lock 84 outwardly from the housing 14. When the trigger 38 is in the operating position, the trigger lock 84 can be depressed and friction with the housing 14 generated by the spring 60 of the rack 50 retains the trigger 38 in the operating position. Thus, the trigger lock 84 selectively locks the trigger 38 in a position corresponding to the open position of the valve 34. Depressing the trigger 38 again will release the friction and cause the trigger lock 84 to move outwardly under the biasing force of the spring 85.

Only a small number of the many possible alternatives are described above. Many additional modifications and alternatives beyond those described above, may be envisioned by those skilled in the art. For example, although the dispensing device is described herein as preferably being driven by pressurized $CO_2$ cartridges, other pressurized gas cartridges, including aerosol containers, may alternatively be used. As another example, the nozzle valve or gas flow control valve may operate independently rather than being both associated with a single trigger.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve drive mechanism for a dispensing device adapted to dispense viscous product from a product cartridge having a valve associated with a dispensing passage, the valve drive mechanism comprising:
    a pinion associated with the valve and adapted to move the valve between an open position and a closed position upon rotation of the pinion;
    a rack associated with the pinion and adapted to rotate the pinion upon linear movement of the rack; and
    a trigger adjacent to a handle, the trigger being configured to be actuated by a user holding the handle in a palm of a hand and pulling the trigger with at least one finger toward the handle and the palm of the hand, the trigger being adapted to impart linear movement to the rack upon manual actuation of the trigger;
    wherein the open position of the nozzle valve permits viscous product to flow through the dispensing passage, and wherein the closed position of the nozzle valve prevents viscous product from flowing through the dispensing passage.

2. A valve drive mechanism according to claim 1, further comprising a biasing member associated with the rack and adapted to bias the valve toward the closed position.

3. A valve drive mechanism according to claim 2, wherein the biasing member is associated with the rack by being in direct physical contact with the rack.

4. A valve drive mechanism according to claim 1, wherein the trigger is adapted to operationally disengage from the rack prior to exerting a force on the valve drive mechanism capable of damaging the valve drive mechanism.

5. A valve drive mechanism according to claim 1, further comprising a locking mechanism is associated with the trigger, the locking mechanism being adapted to selectively lock the trigger in a position corresponding to the open position of the valve.

6. A combination including a valve drive mechanism according to claim 1 and the dispensing device, wherein the dispensing device is adapted to use pneumatic pressure to dispense product from the product cartridge.

7. A device for dispensing a viscous product from a viscous product cartridge, the dispensing device being adapted to be driven by a pressurized gas source, the dispensing device comprising:

a housing adapted to retain the viscous product cartridge and to cooperate with the viscous product cartridge to form a gas enclosure separated from a product enclosure by a movable wall;

a fluid passage extending from an inlet associated with the pressurized gas source to the gas enclosure to enable pressurized gas to generate a dispensing force on the movable wall;

a nozzle adapted to seal to the viscous product cartridge and to provide a dispensing passage for the viscous product cartridge, the nozzle having a valve body located along the dispensing passage and movable between an open position and a closed position;

a pinion associated with the valve body and adapted to move the valve body between an open position and a closed position upon rotation of the pinion;

a rack associated with the pinion and adapted to rotate the pinion upon linear movement of the rack; and a trigger adapted to impart linear movement to the rack upon manual actuation of the trigger.

8. A device for dispensing a viscous product according to claim 7, wherein the trigger includes a drive lug that operates against a notch in the rack to linearly drive the rack.

9. A device for dispensing a viscous product according to claim 8, wherein the drive lug of the trigger and the notch of the rack cooperate to operationally disengage from each other prior to transmitting a force between the trigger and the rack that is capable of damaging the device.

10. A device for dispensing a viscous product according to claim 7, wherein the nozzle is adapted to be threadingly engaged to the viscous product cartridge.

11. A device for dispensing a viscous product according to claim 10, wherein the valve body and the pinion are adapted to interfere with the removal of the nozzle from a viscous product cartridge retained within the housing unless the valve is in the open position.

12. A device for dispensing a viscous product according to claim 7, further comprising a locking mechanism associated with the trigger, the locking mechanism being adapted to selectively lock the trigger in a position corresponding to the open position of the valve body.

13. A valve drive mechanism according to claim 7, further comprising a biasing member associated with the rack and adapted to bias the rack toward a position corresponding to the closed position of the valve.

14. A dispensing device for a viscous product, comprising;

a movable wall separating a product enclosure having a dispensing orifice from a gas enclosure;

a fluid passage providing fluid communication between a pressurized gas cartridge and the gas enclosure;

a nozzle sealed to the product cartridge and providing a dispensing passage for the product cartridge, the nozzle having a valve body located along the dispensing passage and movable between an open position and a closed position;

a pinion associated with the valve body and having a plurality of gear teeth;

a rack having a plurality of cooperating gear teeth drivingly engaged with the plurality of gear teeth of the pinion and having a notch; and a trigger having a drive lug drivingly engaged with the notch of the rack upon manual actuation of the trigger;

wherein manual actuation of the trigger causes the drive lug to linearly drive the rack which causes the cooperating gear teeth of the rack and the plurality of gear teeth of the pinion to rotate the pinion and move the valve body between a closed position which prevents viscous product from flowing through the dispensing passage and an open position which permits viscous product to flow through the dispensing passage.

15. A dispensing device for a viscous product according to claim 14, wherein one of the pinion and the valve body has an elongate drive lug and the other of the pinion and the valve body has an elongate drive notch that cooperates with the driving lug to cause the pinion and the valve body to rotate together.

16. A dispensing device for a viscous product according to claim 15, wherein the nozzle and the product cartridge include cooperating threads connecting the nozzle to the product cartridge, and wherein the nozzle cannot be unscrewed from the housing unless the drive lug is positioned so that a longitudinal axis of the elongate driving notch is substantially parallel to a plane running through the cooperating threads.

17. A dispensing device for a viscous product according to claim 16, wherein the longitudinal axis of the elongate drive lug is positioned substantially parallel to a plane running through the cooperating threads when the valve body is in the open position.

18. A dispensing device for a viscous product according to claim 17, further comprising a locking pin associated with the trigger, the locking pin being manually movable to a locked position when the trigger is in a position corresponding to the open position of the valve.

19. A dispensing device for a viscous product according to claim 14, wherein the nozzle and the product cartridge include cooperating threads connecting the nozzle to the product cartridge.

20. A dispensing device for a viscous product according to claim 14, wherein the drive lug of the trigger and the notch of the rack cooperate to operationally disengage from each other prior to transmitting a force between the trigger and the rack that is capable of damaging the dispensing device.

* * * * *